(12) United States Patent
Sato et al.

(10) Patent No.: US 7,324,475 B2
(45) Date of Patent: Jan. 29, 2008

(54) RADIO COMMUNICATION APPARATUS AND METHOD

(75) Inventors: Kazumi Sato, Kawasaki (JP); Kiyoshi Toshimitsu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1007 days.

(21) Appl. No.: 10/372,320

(22) Filed: Feb. 25, 2003

(65) Prior Publication Data

US 2003/0169760 A1 Sep. 11, 2003

(30) Foreign Application Priority Data

Mar. 5, 2002 (JP) ............................. 2002-058200

(51) Int. Cl.
*H04Q 7/00* (2006.01)
*H04B 1/38* (2006.01)
*H04B 7/02* (2006.01)
*H04L 1/02* (2006.01)

(52) U.S. Cl. .................. 370/329; 370/431; 375/219; 375/267; 455/13.3; 455/21; 455/562.1

(58) Field of Classification Search ............. 370/329, 370/431; 375/219, 267; 455/13.3, 21, 562.1
See application file for complete search history.

(56) References Cited

U.S. PATENT DOCUMENTS

| | | | | |
|---|---|---|---|---|
| 5,404,374 A | * | 4/1995 | Mullins et al. ............. | 375/133 |
| 5,859,870 A | * | 1/1999 | Tsujimoto ................. | 375/143 |
| 5,974,081 A | * | 10/1999 | Rosas et al. ............... | 375/133 |
| 6,122,260 A | * | 9/2000 | Liu et al. .................... | 370/280 |
| 6,492,942 B1 | * | 12/2002 | Kezys ........................ | 342/368 |
| 6,512,738 B1 | | 1/2003 | Namekata et al. | |
| 6,628,638 B1 | * | 9/2003 | Sato et al. .................. | 370/343 |
| 6,728,554 B1 | * | 4/2004 | Wegner ................... | 455/562.1 |
| 6,980,527 B1 | * | 12/2005 | Liu et al. .................... | 370/280 |
| 7,072,586 B2 | * | 7/2006 | Aburakawa et al. ........ | 398/115 |
| 2002/0094087 A1 | * | 7/2002 | Dellmo et al. .............. | 380/270 |

FOREIGN PATENT DOCUMENTS

| | | |
|---|---|---|
| JP | 7-502391 | 3/1995 |
| JP | 10-313274 | 11/1998 |

* cited by examiner

*Primary Examiner*—Alpus H. Hsu
(74) *Attorney, Agent, or Firm*—Oblon, Spivak, McClelland, Maier & Neustadt, P.C.

(57) ABSTRACT

In a radio communication apparatus having a plurality of transmitting and receiving functions that enable simultaneous signal transmission and reception, an arbitrary number of transmitting and receiving functions are assigned to another radio communication apparatus based on channel states.

18 Claims, 6 Drawing Sheets

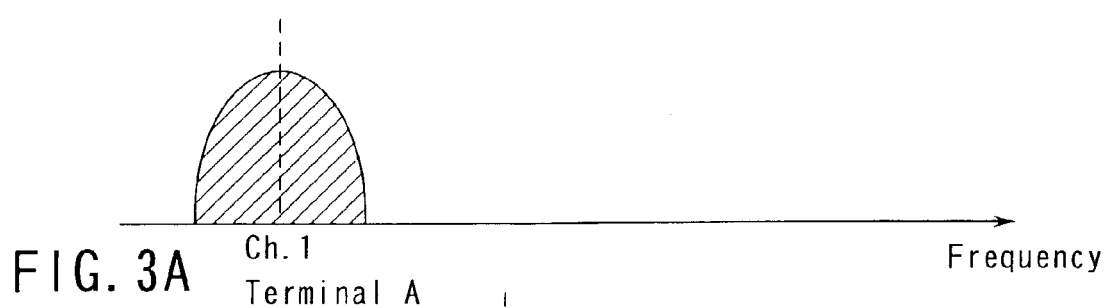
FIG. 3A  Ch. 1 Terminal A  Frequency
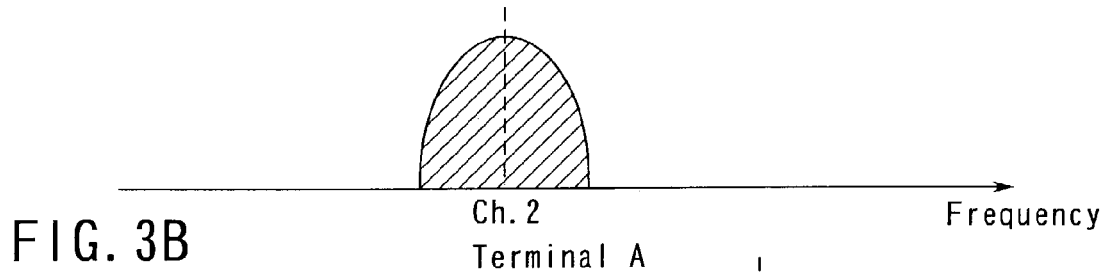
FIG. 3B  Ch. 2 Terminal A  Frequency
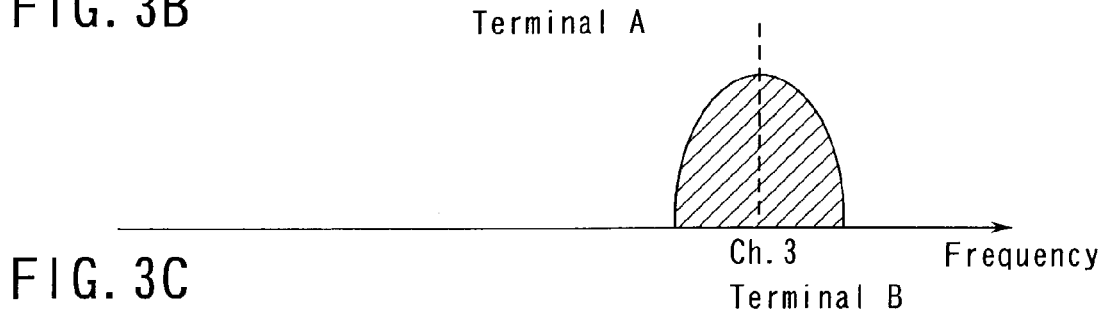
FIG. 3C  Ch. 3 Terminal B  Frequency
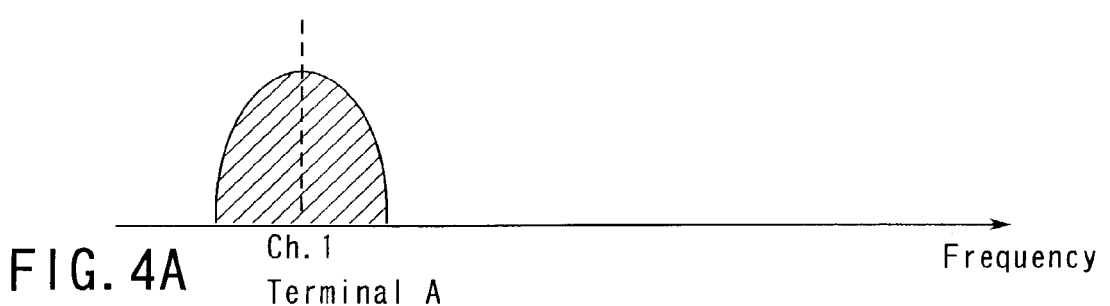
FIG. 4A  Ch. 1 Terminal A  Frequency
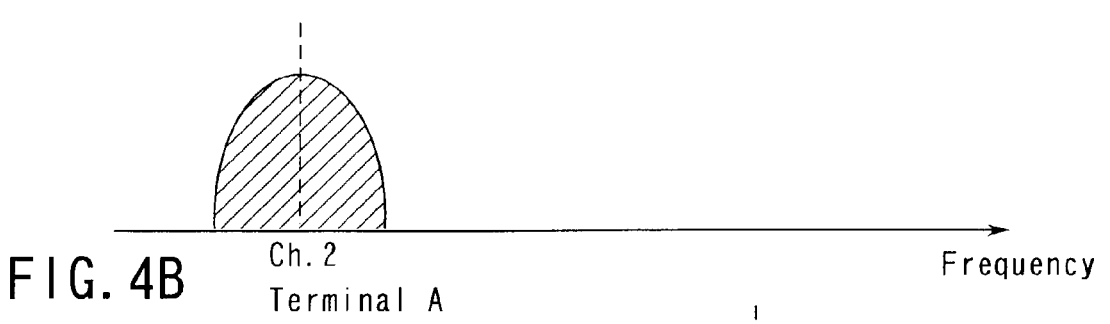
FIG. 4B  Ch. 2 Terminal A  Frequency
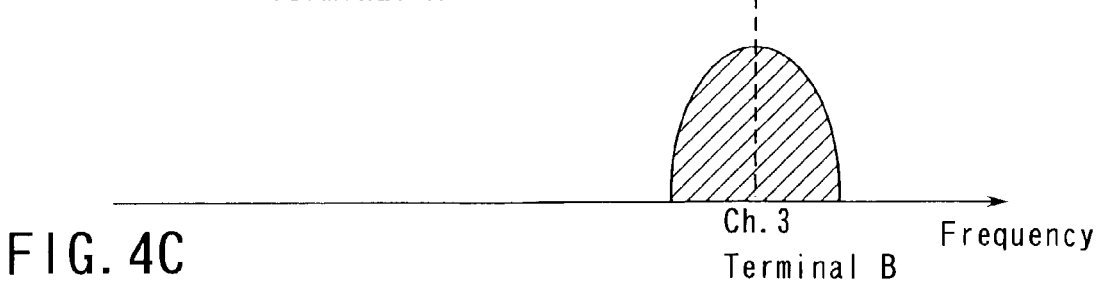
FIG. 4C  Ch. 3 Terminal B  Frequency

RADIO COMMUNICATION APPARATUS AND METHOD

CROSS-REFERENCE TO RELATED APPLICATIONS

This application is based upon and claims the benefit of priority from the prior Japanese Patent Application No. 2002-058200, filed Mar. 5, 2002, the entire contents of which are incorporated herein by reference.

BACKGROUND OF THE INVENTION

1. Field of the Invention

The present invention relates to a radio communication apparatus having a plurality of transmitting and receiving (transmitting/receiving) functions, and a radio communication method employed therein.

2. Description of the Related Art

In radio communication systems, a transmitted signal can be received via various routes due to reflection by buildings. Therefore, a received signal may have distortion that varies depending upon the place, time, etc. Under such propagation circumstances, the influence of distortion is reduced by, for example, changing the transmission conditions such as the modulation method, encoding rate, etc., or by transmitting a signal using a less-distorted channel.

On the other hand, there is a case where a plurality of transceiver units are incorporated in a radio communication apparatus to increase the transmission rate. The radio communication apparatus with a plurality of transceiver units can be simultaneously connected to a plurality of destination radio communication terminals. To reduce the degree of distortion that occurs in signals transmitted from this radio communication apparatus to each destination radio communication terminal, it is desirable to select an optimal channel for each destination terminal.

However, in the above-described radio communication apparatus and method, since only a predetermined transmitting and receiving function is used for communication with a destination terminal, the operating rate of each transceiver unit is limited to a low level. In other words, a plurality of transceiver units cannot be effectively used.

BRIEF SUMMARY OF THE INVENTION

It is an object of the invention to improve the operating rate of a plurality of transmitting and receiving functions, in order to increase the transmission rate and enhance the quality of communication.

To achieve the object, according to an aspect of the invention, there is provided a radio communication apparatus associated with a plurality of radio communication terminals, the apparatus comprises a plurality of transceiver units configured to transmit and receive radio signals to and from the radio communication terminals; a channel state estimating unit configured to estimate channel states between the radio communication terminals based on the radio signals received; and an assignment unit configured to simultaneously assign the transceiver units to a radio communication terminal of the radio communication terminals based on the channel states estimated.

According to another aspect of the invention, there is provided a radio communication method for a radio communication apparatus including a plurality of transceiver units which transmits and receives radio signals to and from a plurality of radio communication terminals, the method comprises estimating channel states between the radio communication terminals based on the radio signals received; and simultaneously assigning a plurality of the transceiver units to one of the radio communication terminals based on the channel states estimated.

BRIEF DESCRIPTION OF THE SEVERAL VIEWS OF THE DRAWING

FIGS. 3A, 3B and 3C are views illustrating examples of spectrum configurations used to explain a radio transmission method according to an embodiment of the invention;

FIGS. 4A, 4B and 4C are views illustrating examples of spectrum configurations used to explain a radio transmission method according to another embodiment of the invention;

DETAILED DESCRIPTION OF THE INVENTION

Figure 1:
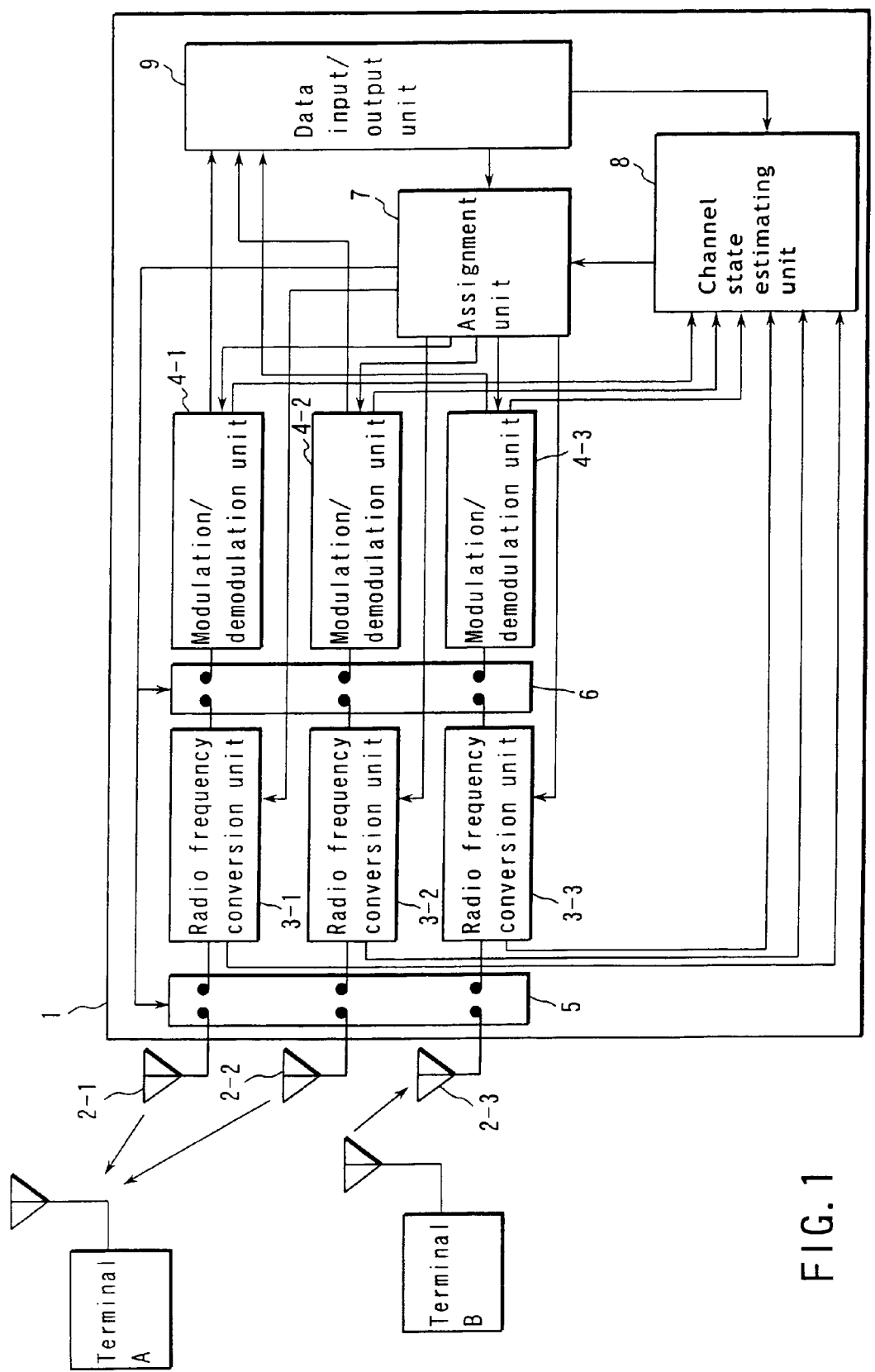
FIG. 1 is a block diagram illustrating a radio communication apparatus according to an embodiment of the invention.

Embodiments of the invention will now be described in detail with reference to the accompanying drawings. FIG. 1 is a block diagram illustrating a radio communication apparatus according to an embodiment of the invention.

In this embodiment, a radio base station equipped with three antennas is assumed as a radio communication apparatus, and a description will be given of the case where terminals A and B are simultaneously connected to the base station. However, the radio communication apparatus of the embodiment of the invention may be a terminal.

A radio base station 1 shown in FIG. 1 has three transceiver units that enable the station to simultaneously transmit and receive signals. The base station 1 is provided with three antennas (2-1-2-3), three radio frequency conversion units (3-1-3-3) and three modulation/demodulation (modulation and demodulation) units (4-1-4-3). A switch group 5 is provided between the antennas (2-1-2-3) and radio frequency conversion units (3-1-3-3), and a switch group 6 is provided between the radio frequency conversion units (3-1-3-3) and modulation/demodulation units (4-1-4-3). The antennas (2-1-2-3) are separate from each other by a half-wave length or more.

In the base station 1 constructed as the above, three transmitting and receiving channels (channel 1 (Ch1), channel 2 (Ch2) and channel 3 (Ch3)) that can simultaneously transmit and receive signals are realized by changing the states of the switch groups 5 and 6 to change the connection between the antennas (2-1-2-3) and radio frequency conversion units (3-1-3-3), and between the radio frequency conversion units (3-1-3-3) and modulation/demodulation units (4-1-4-3).

During transmission, the radio frequency conversion units (3-1-3-3) convert, into radio frequency (RF) signals, the signals generated by the modulation/demodulation units (4-1-4-3), and output the resultant signals to the antennas (2-1-2-3). During reception, the radio frequency conversion units (3-1-3-3) convert, into intermediate frequency signals or baseband signals, the signals received by the antennas (2-1-2-3), and output the signals to the modulation/demodulation units (4-1-4-3). The modulation/demodulation units (4-1-4-3) convert, into transmission signals, the data signals output from an assignment unit 7 during transmission, and convert, into data signals, the signals output from the radio frequency conversion units (3-1-3-3) during reception.

Further, the radio base station can have a configuration in which radio frequency conversion units are made to fixedly correspond to respective antennas, or in which a plurality of radio frequency conversion units are made to correspond to a single antenna, or in which a single radio frequency conversion unit is made to correspond to a plurality of modulation/demodulation units.

Accordingly, the transmission signal generated by, for example, the modulation/demodulation unit (4-1) may be simultaneously transmitted to the radio frequency conversion units (3-1, 3-2). Alternatively, the generated transmission signal may be sequentially transmitted to them.

The change of the frequency in each radio frequency conversion unit (3-1-3-3), the change of the modulation method in each modulation/demodulation unit (4-1-4-3), the change of the states of the switch groups (5, 6) are appropriately executed by a control signal from the assignment unit 7 based on information output from a channel state estimating unit 8, described later. Further, a series of data demodulated by each modulation/demodulation unit (4-1-4-3) is output to a data input/output unit 9.

Figure 2:
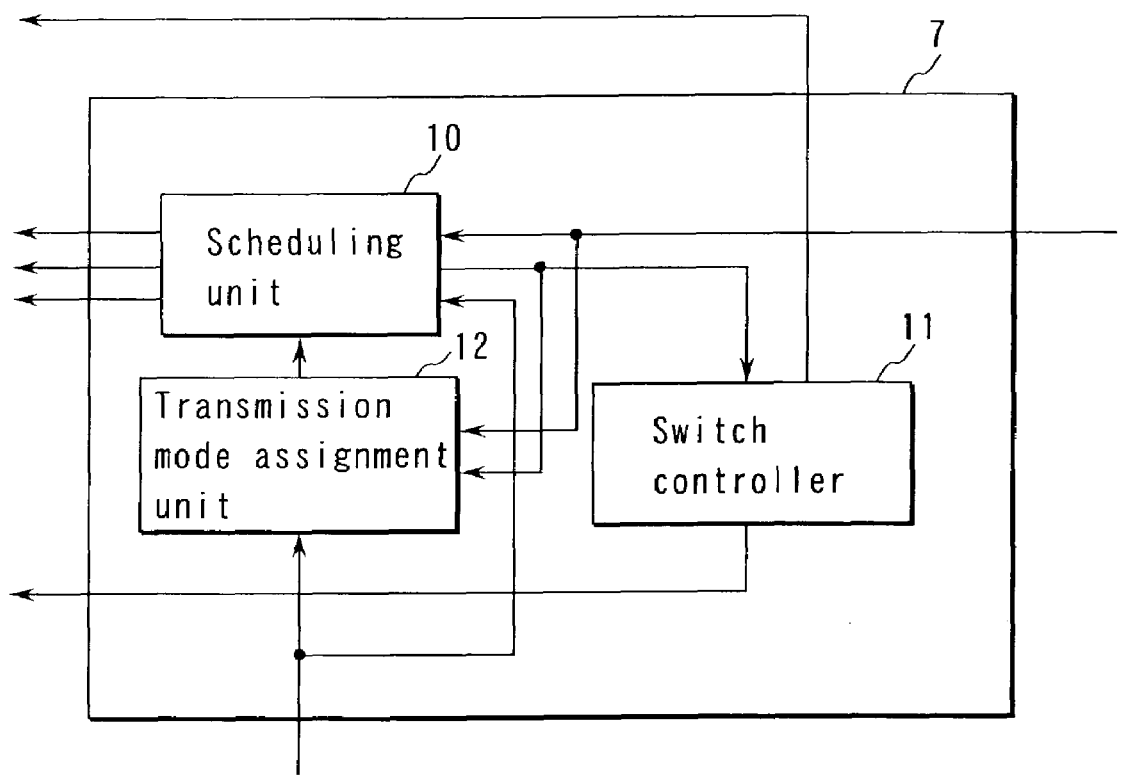
FIG. 2 is a block diagram illustrating an assignment unit appearing in FIG. 1.

FIG. 2 is a block diagram illustrating the configuration of the assignment unit 7 in detail. The assignment unit 7 comprises a scheduling unit 10 for scheduling data, a switch controller 11 for controlling the switch groups 5 and 6, and a transmission mode assignment unit 12 for determining the modulation method and encoding rate to be employed in each transmitting and receiving function.

The transmission operation of the radio base station according to the embodiment will be described.

The data input/output unit 9 inputs, to the assignment unit 7, transmission data to be transmitted from the radio base station 1 to terminals (A, B). In the assignment unit 7, the input transmission data is subjected to scheduling that is executed by the scheduling unit 10 using the modulation method and encoding rate designated by the transmission mode assignment unit 12. The resultant data is sent to each radio frequency conversion unit (3-1-3-3) and each modulation/demodulation unit (4-1-4-3).

The scheduling unit 10 determines a combination of transceiver units and sends combination information to the switch controller 11. The switch controller 11 changes the state of the switch group 5 or 6 to realize the combinations of antennas (2-1-2-3), radio frequency conversion units (3-1-3-3) and modulation/demodulation units (4-1-4-3) determined by the scheduling unit 10. Thus, the transmitting and receiving channels (channels 1 (Ch1)-3 (Ch3)) are scheduled.

The channel state estimating unit 8 supplies the assignment unit 7 with channel information suitable for each terminal to be connected. The channel state estimating unit 8 acquires information indicating that signals output from the terminal A and B are received by the antennas (2-1-2-3), and are input to the radio frequency conversion units (3-1-3-3) and modulation/ demodulation units (4-1-4-3), and also acquires information on the received-signal intensity, channel response, etc. concerning each terminal that can be connected. Based on the acquired information, the unit 8 selects a channel suitable for communication with each terminal.

In accordance with the required transmission rate and quality, the channels 1 and 2, for example, included in the three transmitting and receiving channels (channels 1 (Ch1)-3 (Ch3)) are used for communication with the single terminal A, and the other channel 3 is used for communication with the terminal B, as is shown in FIGS. 3A, 3B and 3C. Thus, the radio frequency conversion units (3-1-3-3) can be set to different radio frequencies as different channels.

When respective transmission signals have been generated by the modulation/demodulation units (4-1-4-3), they are output to the radio frequency conversion units (3-1-3-3) via the switch group 6. The radio frequency conversion units (3-1-3-3) convert the input transmission signals into radio frequency signals corresponding to the channels designated by the assignment unit 7. The resultant signals are transmitted from the antennas (2-1-2-3) to the terminals A and B via the switch group 5.

The terminal A simultaneously receives the transmission signals of different frequencies transmitted via the channels 1 and 2, while the terminal B receives the transmission signal transmitted via the channel 3.

As described above, in the radio base station with a plurality of transceiver units according to the embodiment, the frequencies of the radio frequency conversion units are switched based on the channel state of each terminal, so that a plurality of radio frequency conversion units will be used for communication with a single terminal. As a result, the transmission rate and quality required for communication with each terminal can be satisfied while a plurality of transceiver units are effectively used.

Referring to FIGS. 1 and 4A, 4B and 4C, another embodiment will be described.

When the assignment unit 7 shown in FIG. 1 uses some of the radio frequency conversion units (3-1-3-3) for communication with a single terminal (e.g. terminal A), it can use both the channels 1 and 2 set to the same frequency, as is indicated by the frequency spectrum configuration shown in FIGS. 4A, 4B and 4C. When the two channels are thus set to the same frequency, different signals may be simultaneously sent to the terminal A, using space-time coding transmission, or transmission diversity for transmitting a single signal may be performed.

When space-time coding transmission is performed, one of the modulation/demodulation units (4-1-4-3) may be used for all the processing up to encoding processing, and the signal obtained after encoding may be output to the other modulation/demodulation units and processed by them.

Further, in this embodiment, the base station may perform diversity reception. Specifically, during receiving a signal from each terminal, if the assignment unit 7 is informed of the timing of reception of a transmission signal, each radio frequency conversion unit (3-1-3-3) is set to a designated channel, and waits for the timing of reception. At this time, if the use of one or more of the antennas (2-1-2-3) or the use of one or more of the radio frequency conversion units (3-1-3-3) is not scheduled, diversity reception can be executed by setting the one or more units to the same radio frequency as that set by any one of the already scheduled radio frequency conversion units (3-1-3-3). At this time, at least two of the modulation/demodulation units (4-1-4-3) are made to demodulate received signals which are transmitted from a single terminal as a single transmitted signal, with the result that the reception characteristic is enhanced.

As described above, in the radio base station with a plurality of transceiver units according to the embodiment, if the assignment unit 7 sets, to the same frequency, the transceiver units used to access a single terminal, diversity reception/transmission, space-time coding transmission, etc. can be realized, and hence the quality of communication can be significantly enhanced.

A detailed description will now be given of an operation executed, for assigning a communication channel to each terminal, by the assignment unit 7 and channel state estimating unit 8 shown in FIG. 1.

The radio base station 1 measures, from communication with the terminals A and B, the received-signal intensity of each channel as shown in the following table 1. The measurement results are stored in the channel state estimating unit 8. The measurement results may be stored in the assignment unit 7 instead of the channel state estimating unit 8. Alternatively, a storage dedicated thereto may be provided in the radio base station.

TABLE 1

|  | Channel | Reception field intensity | OK/NG |
|---|---|---|---|
| Terminal A | 1 | −60 dBm | OK |
|  | 2 | −40 dBm | OK |
|  | 3 | −80 dBm | NG |
| Terminal B | 1 | −75 dBm | NG |
|  | 2 | −50 dBm | OK |
|  | 3 | — | — |

As seen from table 1, the channel state estimating unit 8 of the radio base station 1 has already measured the received-signal intensity of each of the channels 1-3 with respect to the terminal A, and that of the channels 1 and 2 with respect to the terminal B. Based on the measurement results, it is estimated whether or not each channel is suitable for each terminal. Table 1 shows the estimation result that if the received-signal intensity of each channel is −70 dBm or more, each channel is usable.

Further, since the antennas (2-1-2-3) are separate from each other by a half-wave length or more, and propagation distortion occurs in each antenna, it is desirable that each channel for each antenna should be subjected to received-signal intensity measurement.

It is determined from the measured received-signal intensities that the channels 1 and 2 are suitable for the terminal A. Therefore, to enhance the quality or rate of transmission, the channels 1 and 2 can be simultaneously used for communication with the terminal A. Naturally, only the channel 1 may be used, estimating from, for example, the state of use of the channels.

In the case of the terminal B, since only the channel 2 is connectable, only the antenna 2-1, radio frequency conversion unit 3-1 and modulation/demodulation unit 4-1, for example, are assigned basically. However, the radio frequency conversion unit 3-2 may also be set to the channel 2 for communication with the terminal B, in order to enhance the transmission quality and rate. Further, since the received-signal intensity of the terminal B with respect to the channel 3 is unclear, it should be measured. The channel state estimating unit 8, radio frequency conversion unit (3-1-3-3) or modulation/demodulation unit (4-1-4-3) measures the received-signal intensity. If the radio frequency conversion unit (3-1-3-3) or modulation/demodulation unit (4-1-4-3) measures the received-signal intensity, the units measured outputs the measurement result to the channel state estimating unit 8.

As described above, in the embodiment, the number of transceiver units or channels to be assigned to each terminal is set in accordance with the received-signal intensity of each terminal. Therefore, a channel that is not suitable for communication is not used, and the frequency band can be efficiently used.

A detailed description will be given of anther operation executed, for assigning a channel used for communication with each terminal, by the assignment unit 7 and channel state estimating unit 8 of FIG. 1.

Figure 5A:
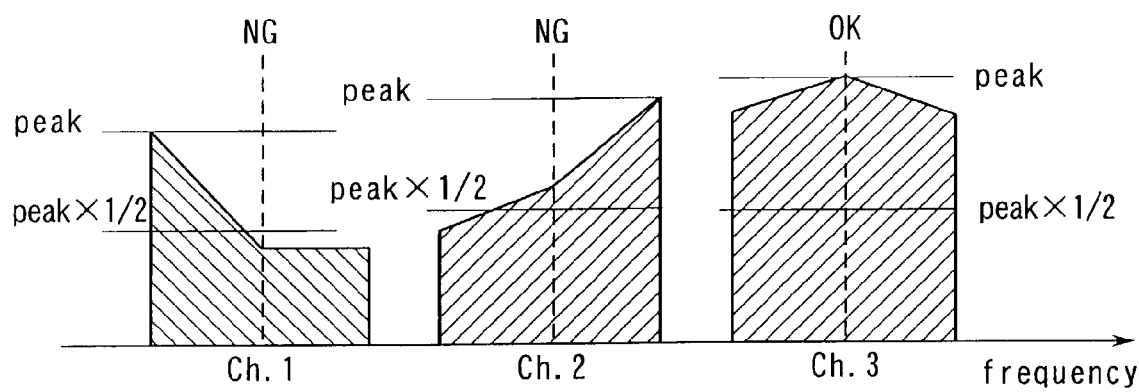
FIGS. 5A and 5B are views illustrating examples of channel responses used to explain a radio transmission method according to yet another embodiment of the invention.
Figure 5B:
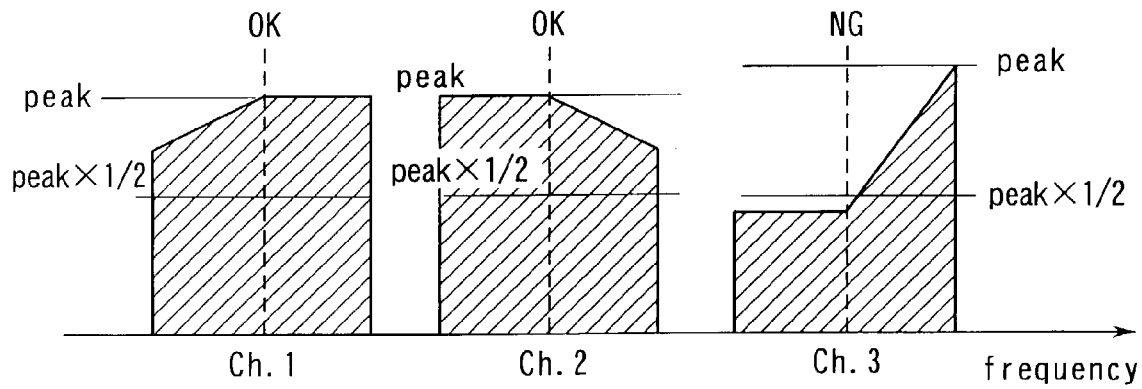

The channel state estimating unit 8 of the radio base station 1 measures, as a result of communication with the terminals A and B, the response of each channel with respect to each of terminals A and B as shown in FIGS. 5A and 5B. The channel state estimating unit 8 estimates, from the measurement results, that the channel which shows a channel response of less distortion with respect to a terminal can be connected to the terminal.

As another type of estimation, a channel is estimated to be connectable if the response of the entire channel exceeds a threshold value set according to the power peak value of the channel response. FIG. 5 illustrates the estimation results obtained when a channel is estimated connectable if the response of the entire channel exceeds 50% of the peak value.

Since the antennas (2-1-2-3) are separate from each other by a half-wave length or more, and propagation distortion occurs in each antenna, it is desirable that each channel for each antenna should be subjected to channel response measurement.

In the examples of FIGS. 5A and 5B, it is estimated that the channel 3 is connectable to the terminal A, and the channels 1 and 2 are connectable to the terminal B. Since only the channel 3 is connectable to the terminal A, only the antenna 2-1, radio frequency conversion unit 3-1 and modulation/demodulation unit 4-1, for example, are assigned to the terminal A, basically. However, the radio frequency conversion unit 3-3 may be set to the channel 3 for communication with the terminal A in order to enhance the transmission quality and rate. Further, since the channels 1 and 2 are suitable for the terminal B, they can be simultaneously used for communication with the terminal B. Naturally, only the channel 1 or 2 may be used, estimating from, for example, the traffic condition on each channel.

As described above, in the embodiment, the number of transceiver units or channels to be assigned to each terminal is set in accordance with the channel response with respect to each terminal. Therefore, a channel that is not suitable for communication is not used, and the frequency band can be efficiently used. The channel response with respect to each terminal is measured by the modulation/demodulation unit (4-1-4-3) or channel state estimating unit 8.

A detailed description will be given of yet another operation executed by the assignment unit 7 of FIG. 1 for assigning a channel used for communication with each terminal.

Figure 6:
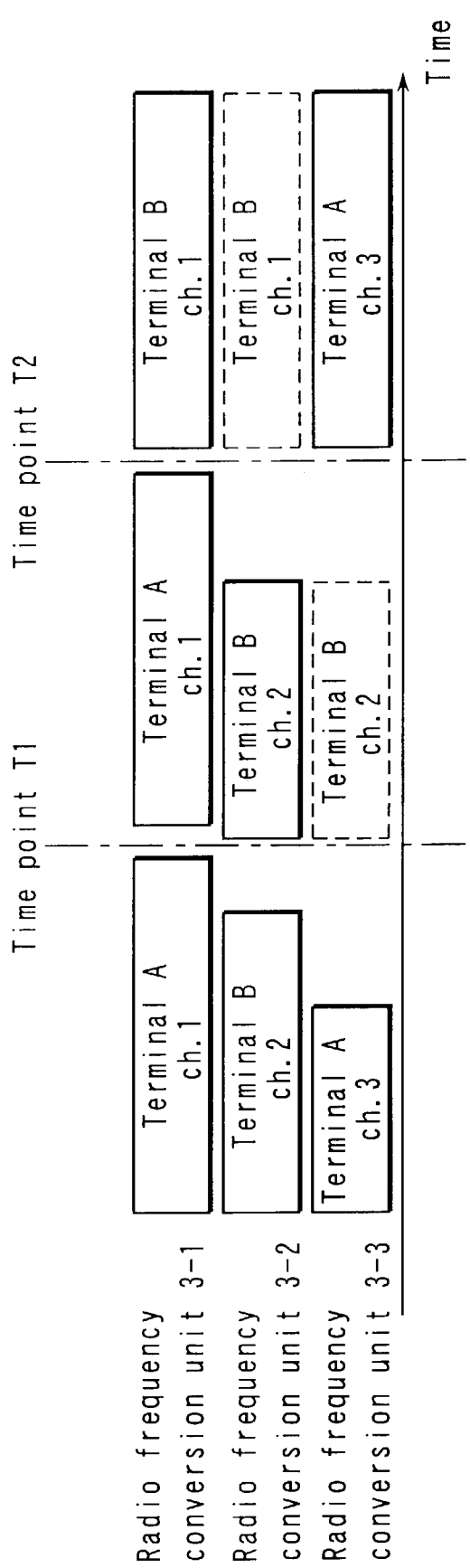
FIG. 6 is a view illustrating examples of channels set in the radio frequency conversion units of the radio communication apparatus of the embodiment.

FIG. 6 shows the channel-assignment states of the radio frequency conversion units (3-1-3-3). Assume that the channel state estimating unit 8 has estimated that the channels 1, 2 and 3 are connectable to the terminal A, while the channels 1 and 2 are connectable to the terminal B.

If only one transceiver unit or channel is assigned to each terminal, the assignment indicated by the solid lines is established. However, if a plurality of transceiver units or channels are assigned to each terminal, considering the state of use of the channels, the assignment indicated by the broken lines is also possible.

In the case of the assignment indicated by the broken lines in FIG. 6, parallel transmission of different transmission data items is performed, until a time point T1, using the channels 1 and 3 for the terminal A. On the other hand, for the terminal B, a single frequency is assigned as the channel 2 to both the radio frequency conversion units 3-2 and 3-3 from the time point T1 to a time point T2, thereby executing diversity reception or reception of a signal transmitted by space-time coding transmission.

Further, even after the time point T2, the terminal B executes diversity reception or receives a signal transmitted by space-time coding transmission. At this time, a single frequency is assigned as the channel 1 to the radio frequency conversion units 3-1 and 3-2 because of a change in channel state.

In other words, different channels, if usable, are assigned to communication with a single terminal, while if only one channel is usable, the channel is assigned to a single terminal and diversity or space-time coding transmission is executed. As a result, the transmission quality and rate can be enhanced.

If the channel 2 becomes unusable after the time point T2 because of, for example, the existence of an interference component, the channel can be set not to be assigned.

Thus, in the embodiment, the number of transceiver units or channels to be assigned to each terminal is set in light of the state of use of the channels. Therefore, a channel that is not suitable for communication is not used, and the frequency band can be efficiently used.

Another embodiment, in which data for channel setting is sent to a destination terminal, will be described.

Figure 7:
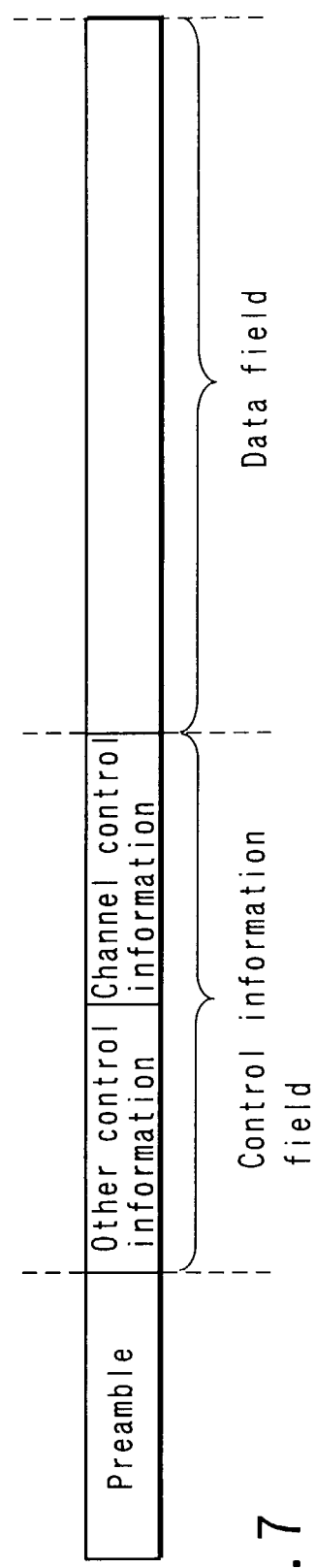
FIG. 7 is a view illustrating an example of a transmission signal that contains channel control information, employed in the radio communication apparatus of the embodiment.

When the radio base station 1 assigns a plurality of channels to a single terminal, or when space-time coding transmission is executed using a single channel, it is necessary to send data for the setting to the terminal. FIG. 7 shows an example of a frame structure for reporting channel information from the radio base station 1 to a terminal. The modulation/demodulation unit (4-1-4-3) writes channel report information, or setting information used when space-time coding transmission is executed, to a portion of a control information field in the frame, and transmits the information to a terminal. The terminal reads the channel report information and executes channel setting or reception mode setting.

Thus, the transmission of channel report information or setting information such as space-time coding to the reception side enables the reception side to correctly recognize the transmission channel.

Figure 8:
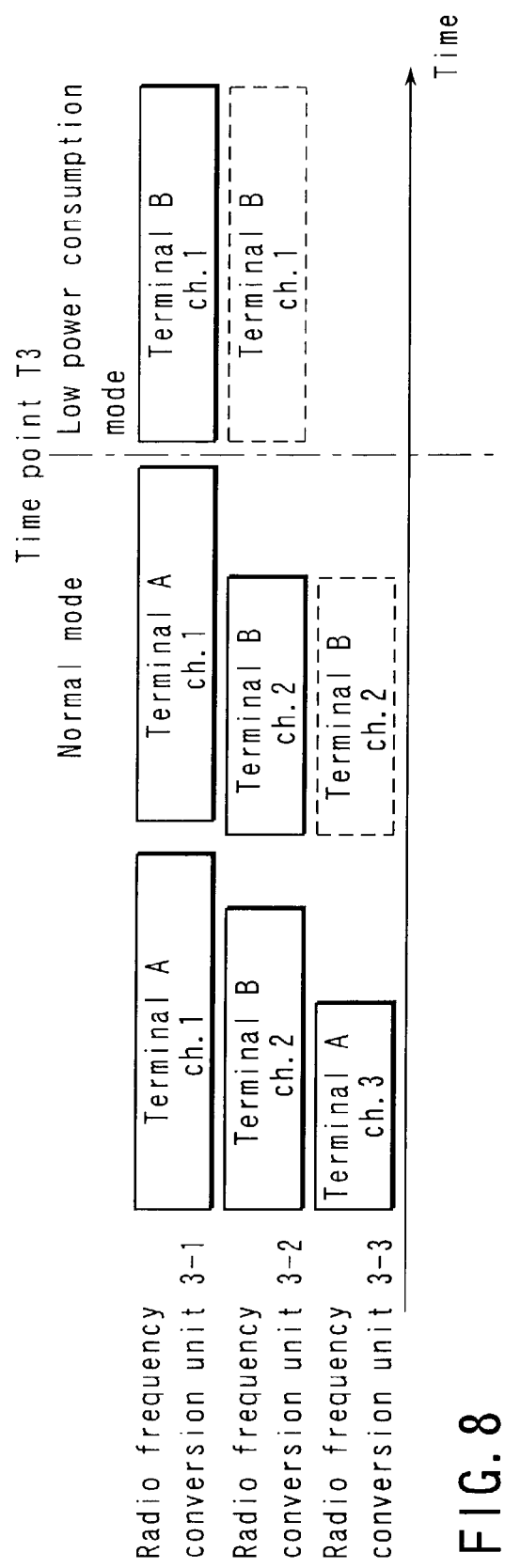
FIG. 8 is a view illustrating other examples of channels set in the radio frequency conversion units of the radio communication apparatus of the embodiment.

A method for changing the number of assigned transceiver units in accordance with the allowable maximum power consumption, according to an embodiment of the invention, will be described.

Where the number of usable transceiver units is preset in accordance with a power setting mode as shown in table 2, in a normal mode, all the transceiver units of the radio base station are operated. On the other hand, if the mode is switched to a low power consumption mode at a time point T3 by a user's operation, no transmitting and receiving function is assigned to the radio frequency conversion unit 3-3, and only two of the three transmitting and receiving functions used in the radio frequency conversion units 3-1 and 3-3 are used, as is shown in FIG. 8.

As described above, in this embodiment, the power consumption can be reduced by changing the number of transceiver units, used simultaneously, in accordance with the allowable maximum power consumption. The channel state estimating unit 8 estimates the allowable maximum power consumption based on the active units.

TABLE 2

| Power setting mode | Number of usable transmitting/receiving functions |
|---|---|
| Low power consumption mode | 2 |
| Normal mode | 3 |

Figure 9:
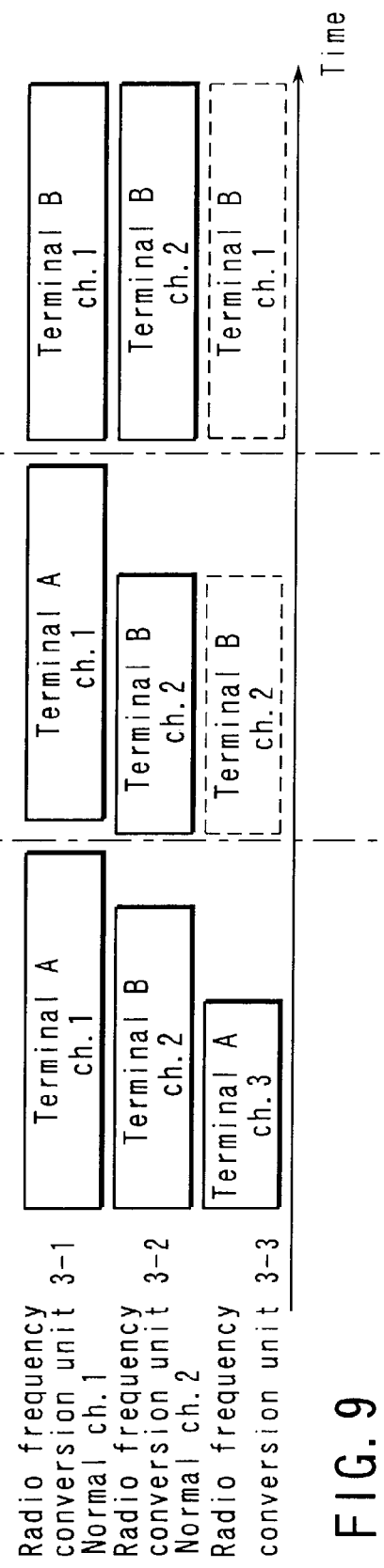
FIG. 9 is a view illustrating further examples of channels set in the radio frequency conversion units of the radio communication apparatus of the embodiment.

Referring now to FIG. 9, a radio communication apparatus according to another embodiment will be described.

Although the configuration of the radio base station of this embodiment is the same as that shown in FIG. 1, the channels assigned to the radio frequency conversion units 3-1 and 3-2 are not changed as long as the terminals registered for the channels exist. In other words, the radio frequency conversion unit 3-1 is assigned to the terminal A, and the radio frequency conversion unit 3-2 to the terminal B. Further, the radio frequency conversion unit 3-3 can use any channel.

Thus, a connectable channel is secured for any terminal registered in the base station 1, and the radio frequency conversion unit 3-3 that can use any channel is additionally used. This enhances the transmission quality and/or rate.

FIG. 9 shows examples of channels set by the radio frequency conversion units 3-1-3-3. The radio frequency conversion unit 3-1 is connected to the terminal A that is set to the channel 1, and the radio frequency conversion unit 3-2 is connected to the terminal B that is set to the channel 2.

Further, the radio frequency conversion unit 3-3 is set to the channel 3 and connected to the terminal A until the time point T1. From the time point T1 to the time point T2, the unit 3-3 is set to the channel 2 and connected to the terminal B. After the time point T2, the unit 3-3 is set to the channel 1 and connected to the terminal B. In other words, by this channel setting, until the time point T1, the terminal A transmits different data items and the terminal B transmits a single data item. Between the time points T1 and T2, the terminal A transmits a single data item, while the terminal B executes communication based on diversity or space-time coding transmission. After the time point T2, the terminal B simultaneously executes diversity or space-time transmission and parallel transmission using different channels.

The channels assigned to the radio frequency conversion units 3-1 and 3-2 may be completely fixed, or may be switched by the assignment unit 7 in accordance with the degree of interference. However, since it is necessary to once release the terminals registered in the base station 1, it is preferable to minimize the frequency of switching. The radio frequency conversion unit 3-3 can switch the channel to the channel 1 or 2 in units of a packet, depending upon the received-signal intensity of each terminal, the channel response, the state of use of each channel, etc., with the result that it can be simultaneously connected to the terminal that is connected to the radio frequency conversion unit 3-1 or 3-2. Further, the unit 3-3 may be connected to the terminal using the channel 3, or to another terminal or base station.

As described above, the embodiment employs a transmitting and receiving function for assigning a channel in a semi-fixed manner, and a transceiver unit for switching the channels, in units of a packet or in units of a user, in accordance with the channel state, such as reception power, channel response, transmission band, etc., estimated by the channel state estimating unit 8. By virtue of these units, a channel that can access each terminal is always prepared, which realizes reliable communication and enhances the transmission quality and/or rate.

Furthermore, in the embodiment, when a plurality of transceiver units are used to transmit or receive a single data item to or from a single terminal, a more efficient modulation or higher encoding rate can be employed than in the case of using a single transmitting and receiving function.

As shown in FIG. 2, during transmission, the data input from the data input/output unit 9 is sent to the scheduling unit 10, where the data is subjected to scheduling using the modulation method and encoding rate designated by the transmission mode assignment unit 12, and then is output to each transceiver unit. The scheduling unit 10 determines combinations of transceiver units, and supplies the switch controller 11 with information on the combinations. The switch controller 11 realizes the combinations of transceiver units determined by the scheduling unit 10, by changing the state of the switch group 5 or 6. At this time, the channel state estimating unit 8 supplies channel state information to the transmission mode assignment unit 12 and scheduling unit 10, where a modulation method and encoding rate according to the channel state of each user is determined, and assignment and scheduling of each transceiver unit is executed. The transmission mode assignment unit 12 can also determine a modulation method or encoding rate using transmitting and receiving assignment information output from the scheduling unit 10.

When, for example, a single data item is transmitted to a single user using a plurality of transceiver units, enhancement of the reception characteristic can be expected, therefore a more efficient modulation method or higher encoding rate may be employed than in the case of using a single transceiver unit.

In addition, when a single data item is transmitted to a single user, the transmission power from each transceiver unit may be lowered. The reduction of transmission power contributes to reduction of the power consumption of the radio communication apparatus.

As described above, in the transceiver apparatus, according to the embodiment of the invention, which has a plurality of transceiver units for simultaneously transmitting and receiving signals, the operating rate of the transceiver units can be improved and the transmission rate or transmission quality can be enhanced, by simultaneously assigning a plurality of transceiver units to a single user, depending upon the channel states.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus associated with a plurality of radio communication terminals, the apparatus comprising:

a plurality of transceiver units configured to transmit and receive radio signals to and from the radio communication terminals;

a channel state estimating unit configured to estimate channel states between the radio communication terminals based on the radio signals received; and an assignment unit configured to simultaneously assign the transceiver units to a radio communication terminal of the radio communication terminals based on the channel states estimated, wherein the transceiver units comprise a plurality of antennas, a plurality of radio frequency conversion units, a plurality of modulation and demodulation units, a first switch group provided between the antennas and the radio frequency conversion units, and a second switch group provided between the radio frequency conversion units and the modulation and demodulation units;

the transceiver units transmitting and receiving the radio signals by setting switches of the first switch group and the second switch group.

2. The radio communication apparatus according to claim 1, wherein the assignment unit assigns the transceiver units to a single frequency band of a channel.

3. The radio communication apparatus according to claim 1, wherein the assignment unit assigns a plurality of the transceiver units to a single frequency band of a channel by executing diversity transmission and reception between the radio communication apparatus and the radio communication terminals.

4. The radio communication apparatus according to claim 1, wherein the assignment unit sets the number of the transceiver units which are assigned to the radio communication terminal, based on received-signal intensities of received signals from the radio communication terminals.

5. The radio communication apparatus according to claim 4, wherein the assignment unit assigns the transceiver units to a single frequency band of a channel.

6. The radio communication apparatus according to claim 1, wherein the assignment unit sets the number of the transceiver units which are assigned to the radio communication terminal, based on channel responses of the radio communication terminals.

7. The radio communication apparatus according to claim 6, wherein the assignment unit assigns the transceiver units to a single frequency band of a channel.

8. The radio communication apparatus according to claim 1, wherein the assignment unit sets the number of the transceiver units which are assigned to the radio communication terminal, based on traffic conditions of frequency bands of channels between the radio communication apparatus and the radio communication terminals.

9. The radio communication apparatus according to claim 8, wherein the assignment unit assigns the transceiver units to a single frequency band of a channel.

10. The radio communication apparatus according to claim 1, wherein the assignment unit sets switches of the second switch group such that a signal from one of the modulation and demodulation units is simultaneously output to the radio frequency conversion units set to a single frequency band of a channel.

11. The radio communication apparatus according to claim 10, wherein the assignment unit assigns the transceiver units to a single frequency band of a channel by executing diversity transmission and reception between the radio communication apparatus and the radio communication terminals.

12. The radio communication apparatus according to claim 1, wherein the assignment unit sets switches of the second switch group such that different signals from one of the modulation and demodulation units are output to the radio frequency conversion units set to a single frequency band of a channel.

13. The radio communication apparatus according to claim 1, wherein the assignment unit sets the number of transceiver units which are assigned to the radio communication terminal, based on allowable maximum power consumption of the radio communication apparatus.

14. The radio communication apparatus according to claim 1, wherein the assignment unit sets the transceiver units to at least one first mode and at least one second mode, the first mode being a mode for switching frequency bands of channels in units of the radio communication terminal or in units of each packet of the radio signals transmitted based on the channel states, the second mode being a mode for setting the number of times the frequency bands are switched in the second mode to a value lower than the number of times the frequency bands are switched in the first mode.

15. The radio communication apparatus according to claim 1, wherein when a single data item is transmitted to or received from the radio communication terminal by the transceiver units, the assignment unit sets the transceiver units such that a more efficient modulation or a higher encoding rate is employed which is than when the single data item is transmitted or received by only one of the transceiver units.

16. The radio communication apparatus according to claim 1, wherein when a single data item is transmitted to or received from the radio communication terminal by the transceiver units, the assignment unit sets the transceiver units such that required power of the transceiver units is lower than that required when the single data item is transmitted or received by only one of the transceiver units.

17. The radio communication apparatus according to claim 1, wherein the transceiver units comprise a unit which transmits, to the radio communication terminals, information indicating frequency bands of channels which the transceiver units use.

18. A radio communication method for a radio communication apparatus including a plurality of transceiver units which transmits and receives radio signals to and from a plurality of radio communication terminals, the transceiver units comprising a plurality of antennas, a plurality of radio frequency conversion units, a plurality of modulation and demodulation units, a first switch group provided between the antennas and the radio frequency conversion units, and a second switch group provided between the radio frequency conversion units and the modulation and demodulation units, the method comprising:

estimating channel states between the radio communication terminals based on the radio signals received;

simultaneously assigning a plurality of the transceiver units to one of the radio communication terminals based on the channel states estimated; and setting switches of the first switch group and the second switch group to control transmitting and receiving of the radio signals by the transceiver units.

* * * * *